May 8, 1934.                S. J. HABERMAN                1,958,339
                               CAMERA
                         Filed Sept. 28, 1932
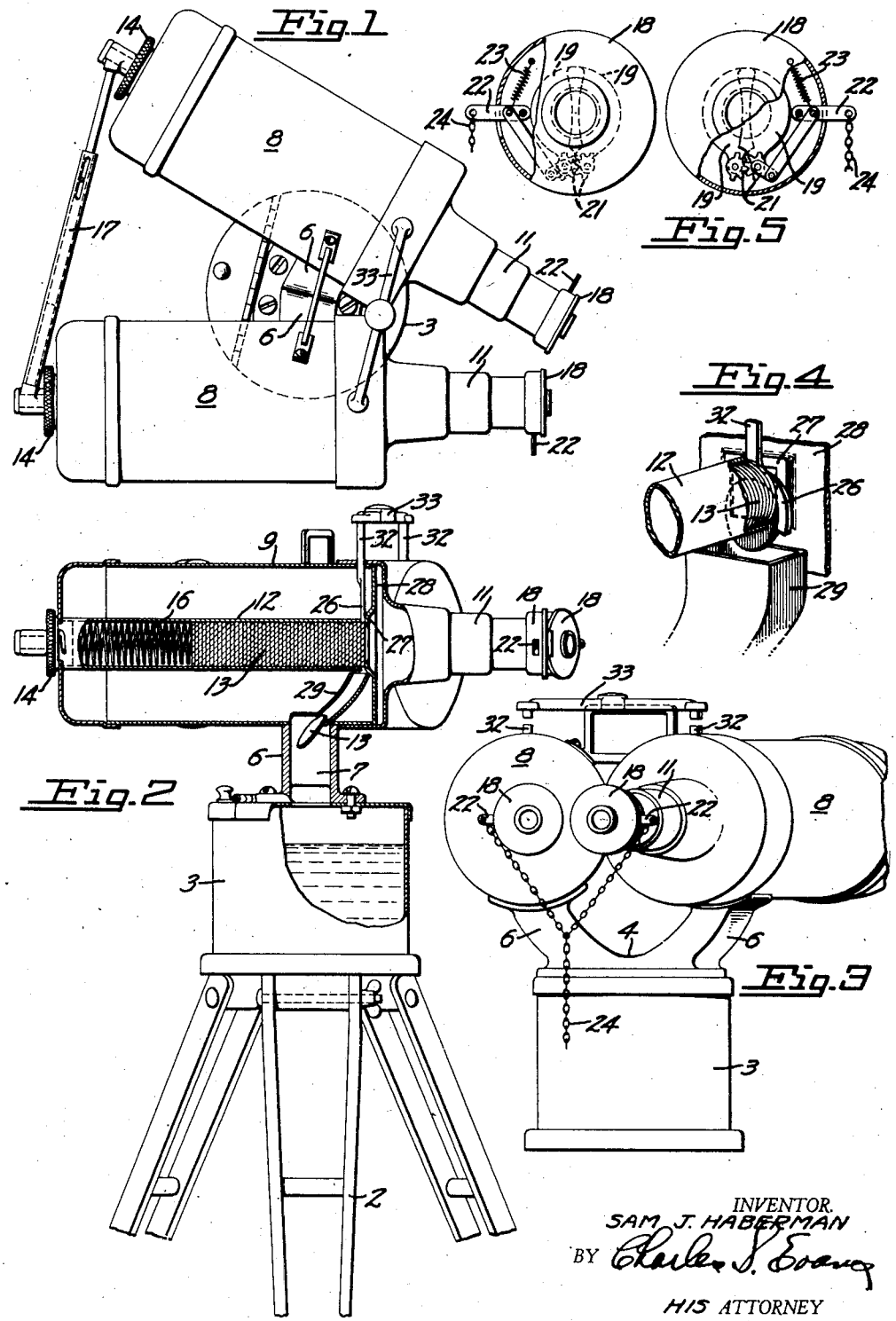
INVENTOR.
SAM J. HABERMAN
BY Charles J. Evans
HIS ATTORNEY Patented May 8, 1934

1,958,339

UNITED STATES PATENT OFFICE 1,958,339

CAMERA

Sam J. Haberman, Santa Cruz, Calif.

Application September 28, 1932, Serial No. 635,142

7 Claims. (Cl. 95—13)

My invention relates to a camera, and more particularly to a biascope camera.

It is among the objects of my invention to provide a camera of the self developing type which will take two pictures simultaneously.

Another object of my invention is to provide an improved shutter construction for a camera of the character described.

A further object of my invention is to provide means for simultaneously discharging the exposed plates from the camera units.

The invention possesses other objects and features of advantage, some of which, with the foregoing, will be set forth in the following description of my invention. It is to be understood that I do not limit myself to this disclosure of species of my invention, as I may adopt variant embodiments thereof within the scope of the claims.

Referring to the drawing:

Figure 1 is a plan view of the camera embodying my invention.

Figure 2 is a side view, partly in section and partly in elevation, of the camera; and Figure 3 is a front elevation of the same.

Figure 4 is a detail view showing the means for removing an exposed plate from the magazine.

Figure 5 is a front view, partly in section and partly in elevation, showing the shutter construction.

In terms of broad inclusion, the camera embodying my invention preferably comprises a support upon which a developing tank is mounted. A yoke is preferably provided on the tank, each arm of the yoke having a passage therein communicating with the tank, and a camera unit is mounted on each of the yoke arms. The camera units preferably comprise a magazine for holding a plurality of sensitized plates, and a shutter is provided adjacently ahead of each magazine. Means are provided for actuating the shutters to simultaneously expose a plate in each of the magazines. Means are also preferably provided for simultaneously removing the exposed plates from the magazines, and means are provided for guiding the removed plates into the passages of the yoke arms. A removable mounted cap is preferably provided at the rear of each magazine by which the latter may be loaded, and means are provided for connecting the caps together.

In greater detail, the camera embodying my invention comprises a suitable support or tripod 2, upon which a developing tank 3 is mounted. A yoke 4, preferably of one piece construction, is suitably secured on top of the developing tank 3, and each of the arms 6 of the yoke is provided with a passage 7 communicating with the tank.

A camera unit, generally designated by the reference numeral 8, is mounted on each of the yoke arms 6. These camera units preferably comprise a cylindrical housing 9 having a reduced neck portion 11; the housings being positioned with their axes angularly disposed, as is probably best shown in Figure 1. A tubular magazine 12 is secured in each housing, and is adapted to hold a plurality of sensitized plates 13. The plates are loaded through the rear of the magazine by removing a detachably mounted cap 14. A spring 16, interposed between the cap 14 and the plates 13, operates to feed the plates toward the forward or head end of the magazine.

The removably mounted end caps 14 are preferably connected by a suitable link 17, as an aid in preventing their being lost. Since the camera units 8 are angularly positioned, the connecting link is preferably of telescopic construction, as shown in Figure 1.

A shutter 18 is mounted on the forward end of each of the housing necks 11, and means are provided for simultaneously actuating the shutters. In order that the shutters may be conveniently and safely actuated at the same time, the shutters are preferably of right and left hand construction. With particular reference to Figure 5, the shutters preferably comprise a pair of separable leaves 19 rotatably connected by suitable gears 21, and actuated by a suitable linkage including an outwardly extending actuating lever 22; the leaves 19 being held in the normally closed position by a suitable spring 23.

As shown in Figure 5, the general construction of the two shutters is similar, but the arrangement is such that the levers 22 extend from opposite sides of the shutter casings. This right and left hand shutter construction eliminates the difficulties that would arise if one of the levers 21 were positioned between the heads of the camera units, as would result if two ordinary shutters were employed. Suitable means common to both of the shutters, such as the chain 24, is connected to the levers 22 for actuating the shutters.

Means are provided for simultaneously removing the exposed plates from the magazines 12. For this purpose a yoke plate 26 is slidably mounted between the head end of the magazine of each unit and a window frame 27 of the housing partition 28; the yoke plate being arranged to engage the exposed plate for shifting the latter downwardly. A guide chute 29 is arranged to direct the removed plate into the passage 7 of the yoke arm 6.

The yoke plate 26 of each camera unit is provided with an upwardly extending shank 32, and these shanks are connected above the housings 9 by a suitable cross bar 33. By this construction a single movement of the operator's hand functions to discharge both of the exposed plates into the developing tank 3.

I claim:

1. A biascope camera comprising a pair of camera units each having a magazine for holding a plurality of sensitized plates, and ejector means for simultaneously removing plates from said magazines.

2. A biascope camera comprising a pair of camera units each having a magazine for holding a plurality of sensitized plates, an ejector slidably mounted adjacent the head end of each magazine for removing a plate therefrom, and means connecting said ejectors for movement together.

3. A biascope camera comprising a pair of camera units each having a magazine for holding a plurality of sensitized plates, a yoke plate slidably mounted adjacent the head end of each magazine and engageable with a plate held thereby for removing the same from the magazine, a shank extending upwardly from each yoke plate, and a bar connecting said shanks.

4. A biascope camera comprising a supporting yoke, and a camera unit holding sensitized plates mounted on each arm of the yoke, said arms having passages communicating with the camera units for conducting exposed plates out of said units.

5. A biascope camera comprising a supporting yoke, a camera unit holding sensitized plates mounted on each arm of the yoke, said arms having passages communicating with the camera units for conducting exposed plates out of said units, and means for simultaneously ejecting plates from the units.

6. A biascope camera comprising a developing tank, a yoke mounted on said tank, and a camera unit holding sensitized plates mounted on each arm of the yoke, said arms having passages communicating between the camera units and developing tank for conducting exposed plates from the units to said tank.

7. A biascope camera comprising a developing tank, a yoke mounted on said tank, a camera unit holding sensitized plates mounted on each arm of the yoke, said arms having passages communicating between the camera units and developing tank for conducting exposed plates from the units to said tank, and means for simultaneously ejecting plates from the units for deposit in said tank.

SAM J. HABERMAN.